United States Patent [19]
Zobel

[11] Patent Number: 5,327,283
[45] Date of Patent: Jul. 5, 1994

[54] ENDOSCOPE OPTICAL SYSTEM

[75] Inventor: Jürgen Zobel, Bretten, Fed. Rep. of Germany

[73] Assignee: Richard Wolf GmbH, Knittlingen, Fed. Rep. of Germany

[21] Appl. No.: 51,075

[22] Filed: Apr. 21, 1993

[30] Foreign Application Priority Data

May 29, 1992 [DE] Fed. Rep. of Germany ....... 4217889

[51] Int. Cl.$^5$ .............................................. G02B 23/00
[52] U.S. Cl. .................... 359/434; 359/717; 359/793
[58] Field of Search ............... 359/717, 434, 793, 656, 359/647, 466

[56] References Cited

U.S. PATENT DOCUMENTS

| | | | |
|---|---|---|---|
| 4,300,812 | 11/1981 | Nakahashi | 359/434 |
| 4,501,477 | 2/1985 | Sunaga | 359/434 |
| 4,662,725 | 5/1987 | Nisioka | |
| 4,806,001 | 2/1989 | Okabe et al. | |
| 4,946,267 | 7/1990 | Hoogland | 359/435 |

FOREIGN PATENT DOCUMENTS

| | | |
|---|---|---|
| 0093559A1 | 11/1983 | European Pat. Off. |
| 3600573A1 | 7/1986 | Fed. Rep. of Germany |
| 3600573C2 | 7/1988 | Fed. Rep. of Germany |

OTHER PUBLICATIONS

Abstract No. 63-113415(A) dated Sep. 28, 1998, vol. 12, No. 361.
Derwent Abstract No. 85-158083/26 dated Aug. 8, 1985.

Primary Examiner—Loha Ben
Assistant Examiner—Evelyn A. Lester
Attorney, Agent, or Firm—Cohen, Pontani, Lieberman, Pavane

[57] ABSTRACT

The endoscope optical system has an objective with an object-side negative lens cluster, the constructional design of which should minimise or exclude image scale defects, such as distortion and field curvature. The object-side negative lens cluster comprises two menisci each having negative refractive power. The individual defects of distortion occurring at the surfaces are reduced as a result of the meniscus-like design, and a flattened image field, that is prevention of field curvature, is achieved as a result of splitting the lens cluster into two menisci. The object-side meniscus may be designed as a single lens or as a cemented component comprising an outer lens and an inner lens. Since the distortion defect at the cement surface has a negative sign, the defects are thus partially compensated at the outer surfaces of the meniscus.

8 Claims, 4 Drawing Sheets

ENDOSCOPE OPTICAL SYSTEM

BACKGROUND OF THE INVENTION a) Field of the Invention

The invention relates to an endoscope optical system, in which the object-side part of the objective is a negative lens cluster.

b) Description of the Prior Art

In contrast to photo-objectives and other optical systems, endoscopes have considerable residual defects. On the one hand this is caused by the many components, such as objective, ocular and image dissemination system, and on the other hand by the fact that only simple optical components may be used for reasons relating to cost and manufacture. The adjustment of an endoscope optical system must therefore be optimised by balancing the adjustment of the objective with the adjustment of ocular and image dissemination system.

Image definition and image scale defects occur in the entire optical system. The main image definition defects, such as astigmatism and coma, are corrected in conventional manner in that the so-called rear lenses of the image-side lens cluster are designed as an achromatic objective. Care must now also be taken to ensure that the image scale defects, such as distortion and field curvature, are minimised in the endoscope optical system or completely eliminated. Hitherto the distortion in endoscopes has not been corrected for the reasons relating to manufacture and cost already mentioned. Known endoscopes or endoscope optical systems therefore have a distortion of up to 20%. However, this causes an unreal image, since barrel-shaped distortions usually occur which have to be removed. The same applies to field curvature. As a result of field curvature, the definition planes of the optical system lie at different focus positions for the centre and for the edge.

However, only one focus position may be set for photographic, film and video systems. For this reason the focussing must be mediated between centre and edge of the optical system, that is averaging is required for focussing. However, this has the disadvantage that it results in lower resolution of the optical system. On the other hand an optical system with a flattened image field has greater resolution. The field curvature may be corrected by means of a suitable lens combination. Since it is only reduced by negative refractive powers, adjustment of field curvature is omitted in the ocular and in the image dissemination system in order to keep the components simple with regard to their constructional design and their manufacture. However, adjustment is currently only partially possible in the objective, if for example a negative is used.

The invention proposes an objective with a negative lens cluster for endoscopes or endoscope optical systems, the constructional design of which should exclude the distortions in question. In addition, field curvature should be considerably reduced such that a flattened image field is produced.

SUMMARY OF THE INVENTION

In accordance with the invention, this object is achieved by an endoscope optical system in which the object-side part of the objective is a negative lens cluster, wherein the lens cluster comprises two menisci each having negative refractive power, wherein the object-side meniscus $L_x$ and the image-side meniscus $L_y$ lie on the same axis, and wherein the following relationships apply for the refractive index n and the Abbe number $v$ of the menisci:

$$n(L_x) < n(L_y)$$

$$v(L_x) > v(L_y)$$

The object-side meniscus $L_x$ may be designed as a cemented component comprising an outer lens $L_1$ and an inner lens $L_2$ which lie on the same axis as the lens $L_3$ forming the image-side meniscus $L_y$, the following relationships applying for the refractive index n and the Abbe number $v$ of the lenses $L_1$, $L_2$ and $L_3$:

$$n(L_2) < n(L_1)$$

$$n(L_2) < n(L_3)$$

$$v(L_2) > v(L_1)$$

$$v(L_2) > v(L_3)$$

It is known that the adjustment of field curvature behaves in proportion to the extent of the curvature of a negative. This means that the greater the curvature of the negative, the greater also the adjustment of field curvature which can be achieved therewith. However, for technical reasons, limits are placed on the extent of the curvature. The advantage of the invention is that a greater effect is achieved by using two lenses each having extreme curvature and hence an even more extreme adjustment of field curvature is achieved than when using only one lens. A flattened image field is achieved as a result of this constructive measure. In addition, a meniscus-like design for the lenses has a positive effect on the adjustment of the distortion, since the individual defects in distortion occurring at the surfaces are reduced as a result.

Furthermore, removing the distortion is achieved in particular in that the object-side meniscus, which comprises an outer biconvex lens and an inner biconcave lens, is designed as a cemented component, since the distortion defect at the cement surface has a negative sign. This means that the defects are thus partially compensated at the outer surfaces of the meniscus.

The lens forming the image-side meniscus is advantageously designed as a single lens and is situated on the same axis as the object-side meniscus. There is also the possibility of designing the image-side lens as an aspherical lens, by means of which a reduction in distortion at the edge region is achieved.

The two menisci or meniscus and aspherical lens should be cemented into a common holder. This design has the advantage that the lenses form a constructional unit and hence may be aligned in front of the other components of the objective.

Furthermore, the image-side meniscus is cemented into the common holder without backlash. The cemented component forming the object-side meniscus is cemented into the holder to run true, that is aligned to be centred with the image-side meniscus. The cemented unit comprising object-side lens cluster and systems following on the image-side thus have fewer tolerance-determined residual defects.

The holder of the object-side part of the objective has, as an aperture stop, an edge at least partially overlapping the object-side meniscus, and a stop cap is also cemented on this meniscus, so that there is shielding from extraneous light.

BRIEF DESCRIPTION OF THE DRAWINGS

The foregoing summary of the invention, as well as the following detailed description of the preferred embodiments, will be better understood when read in conjunction with the appended drawings. For the purpose of illustrating the invention, there are shown in the drawings embodiments which are presently preferred, it being understood, however, that the invention is not limited to the specific arrangements and instrumentalities disclosed. In the drawings.

DESCRIPTION OF THE PREFERRED EMBODIMENTS

Figure 1:
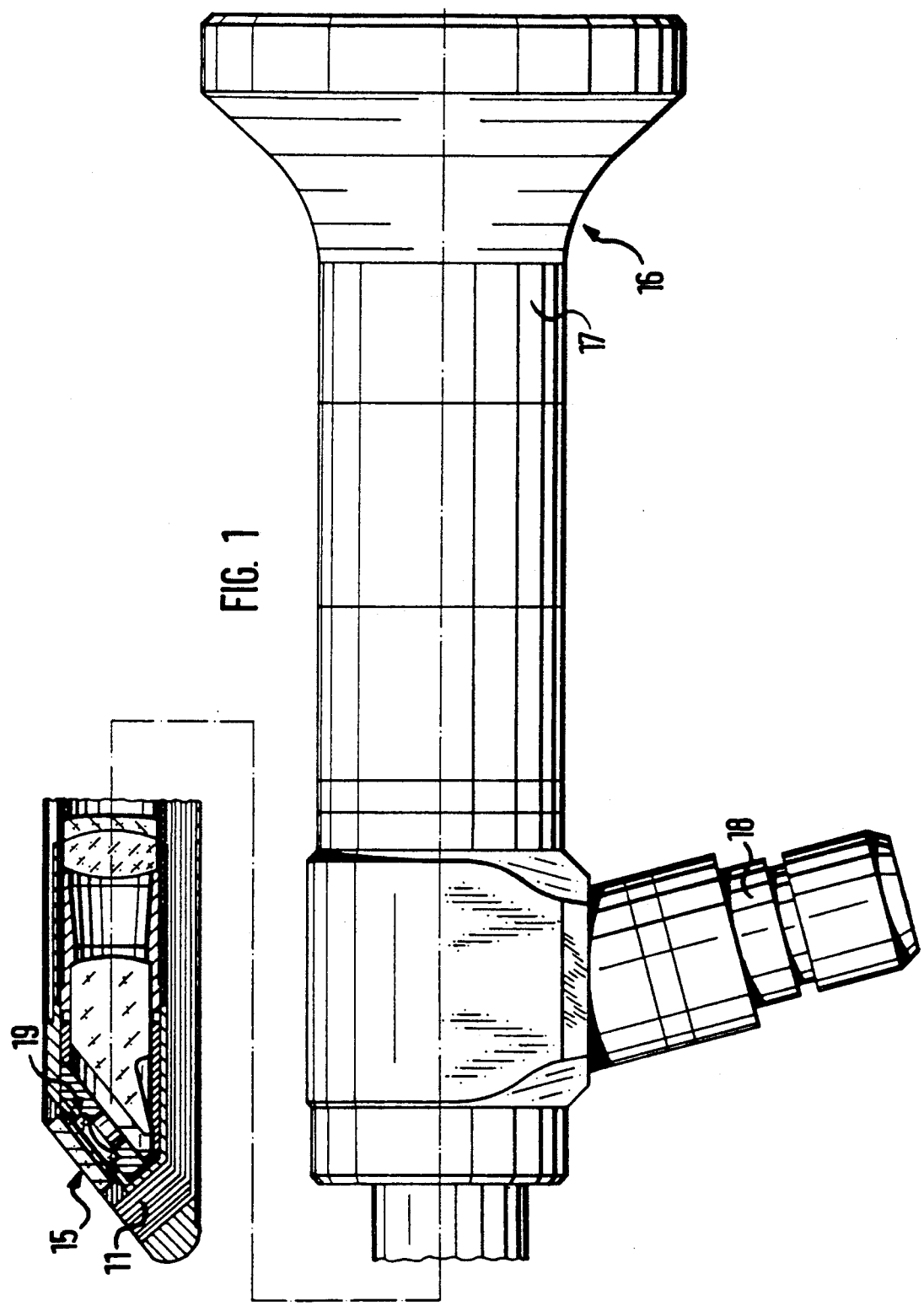
FIG. 1 shows an endoscope optical system with the represented proximal end and longitudinally sectioned distal end.

FIG. 1 shows an endoscope optical system of the invention which essentially comprises an objective 19 at the distal end 15, an image dissemination system and an ocular funnel 17 with the ocular, not shown, at the proximal end 16.

The objective 19 produces the image of the object to be observed. This image is transmitted through an optical system following the objective 19 and finally reaches the ocular funnel 17, in which the image is formed and may then be observed by the user of the optical system.

A light-conducting cable leading to a light projector may be connected to the connection 18 to feed light into the light guide 11, the light for illuminating the object to be observed emerging from the distal end thereof.

The actual inventive idea to achieve a distortion-free endoscope optical system with flattened image field lies particularly in a constructive measure at the objective 19. In order to illustrate this, the object-side part of the objective with its individual components is shown in FIG. 2 once again in longitudinal section and on a enlarged scale.

The constructional unit 6 comprises two menisci each having negative refractive power. In this exemplary embodiment the object-side meniscus is designed as a cemented component comprising an outer biconvex lens 1 (L1) and an inner biconcave lens 2 (L2), which lie on the same axis as the lens 3 (L3) forming the image-side meniscus. As an alternative solution to the exemplary embodiment shown here, the image-side lens 3 may also be designed as an aspherical lens, that is, may have a shape deviating from the spherical shape, by means of which less distortion may be achieved at the edge region. The refractive indices n of the individual lenses 1, 2 and 3 (L1, L2 and L3) and their particular Abbe number v should fulfil the following relationships:

$$n(L2) < n(L1)$$

$$n(L2) < n(L3)$$

$$v(L2) > v(L1)$$

$$v(L2) > v(L3)$$

The two menisci are situated in a common holder 4, and in particular such that the image-side meniscus 3 is cemented into the holder 4 without backlash, and in that the cemented component 1 and 2 forming the object-side meniscus is cemented into the holder to run true, that is aligned to be centred with the image-side meniscus 3.

The holder has, as an aperture stop, an edge 4a at least partially overlapping the objectside meniscus 1 and 2, and a stop cap 5 is additionally cemented on the object-side meniscus 1, so that protection against extraneous light is ensured. This constructional unit 6 shown here, comprising the individual parts 1, 2, 3, 4 and 5, is aligned with an optical system following on the image side and which is partially shown in FIG. 3, 4 and 5.

A viewing window 7 is situated in each case on the object side in front of the unit 6 of the objective. Moreover, different exemplary embodiments of objectives 19 and transmitting image dissemination system 8, 9 or 8, 10 of endoscope optical systems of the invention are shown, the embodiments applying to different viewing directions.

Figure 3:
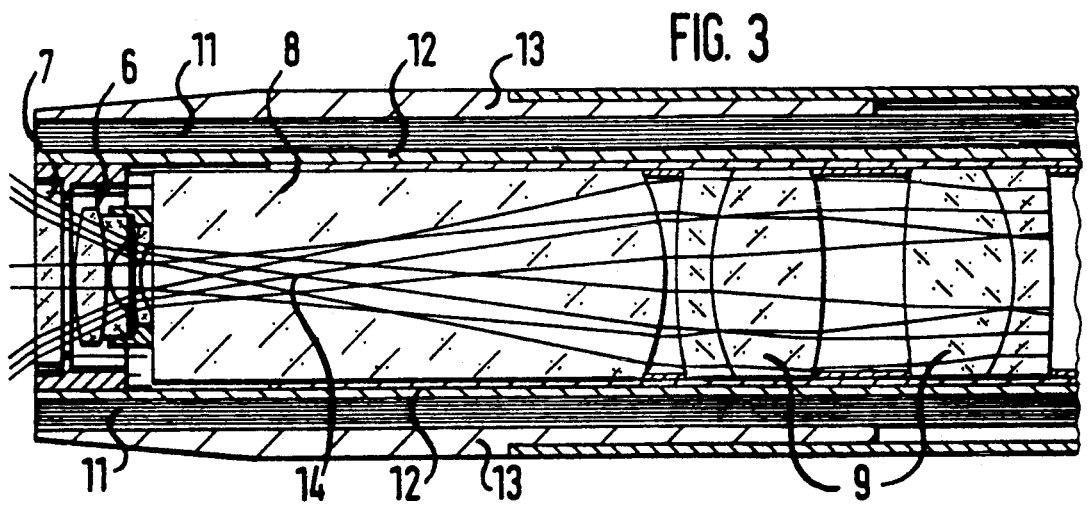
FIG. 3 shows a longitudinal section through the distal end of an endoscope optical system at 0° direct view.
Figure 4:
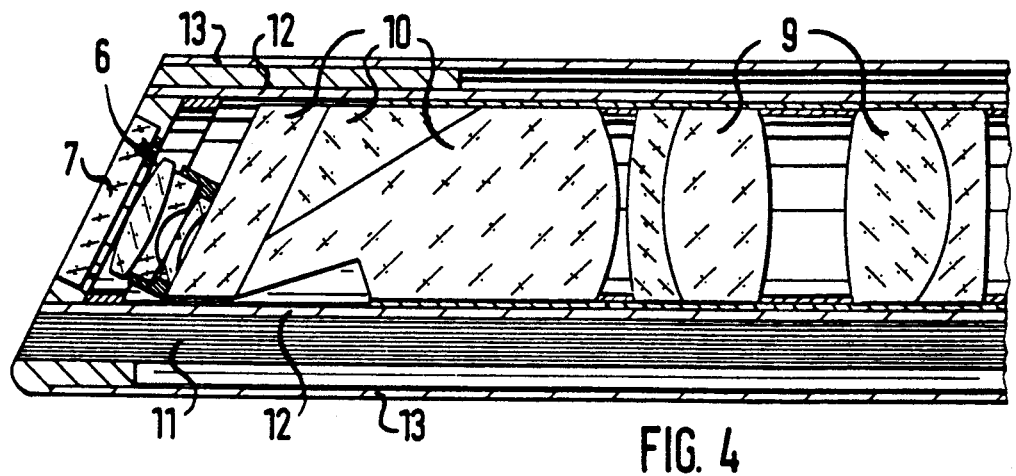
FIG. 4 shows a longitudinal section through the distal end of an endoscope optical system at 25° forward view.
Figure 5:
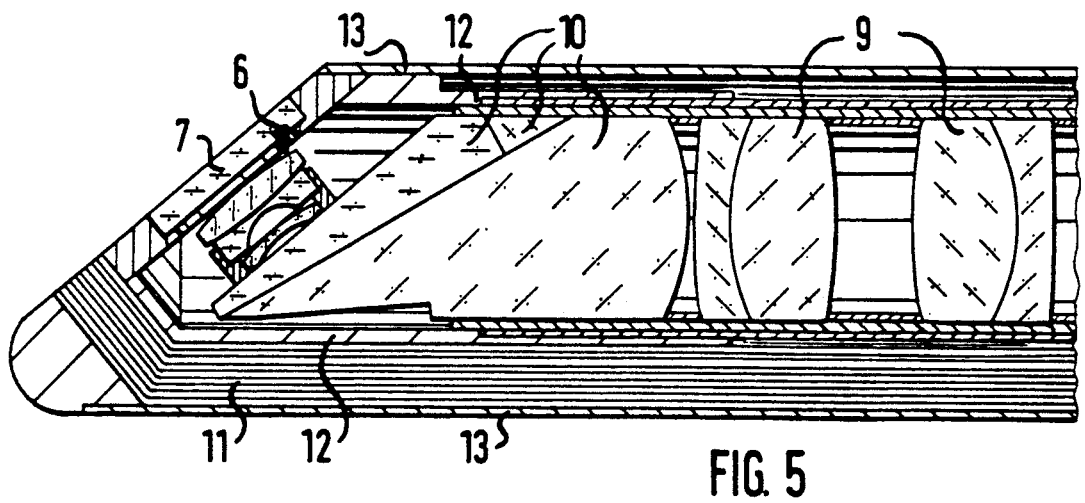
FIG. 5 shows a longitudinal section through the distal end of an endoscope optical system at 50° side view.

FIG. 3 shows an endoscope optical system for 0° direct view, FIG. 4 shows an endoscope optical system for 25° front view and FIG. 5 shows an optical system for 50° steep view. Other viewing directions are of course also possible with the appropriate selection of lens or refracting prism. The basic construction of all exemplary embodiments is the same. However, the endoscope optical systems without a direct view have a different construction from the optical system with a direct view in that the optical construction is not symmetrical as in FIG. 3, but is asymmetrical, which also determines a different shape and arrangement for the light guide 11.

The object-side part 7, 6 of the objective can be seen in all exemplary embodiments, and in addition the optical system transmitting the image can be seen. For the direct view a rod-like planoconvex lens 8 follows on from the object-side negative lens cluster 6, appropriate refracting prisms 10 in the case of other viewing directions, and then the image produced is guided through the image-side lens cluster 9, the so-called rear lenses. The rear lenses 9 are designed as an achromatic objective. The course of the ray paths 14 has been shown in FIG. 3 by way of illustration.

All the optical components 7, 6, 8 or 10 and 9 are situated in an inner tube 12, which is totally surrounded by the light guide 11 (FIG. 3) or partially surrounded (FIGS. 4 and 5). Moreover, the entire optical system including light guide 11 is surrounded by an encasing tube 13.

Figure 6:
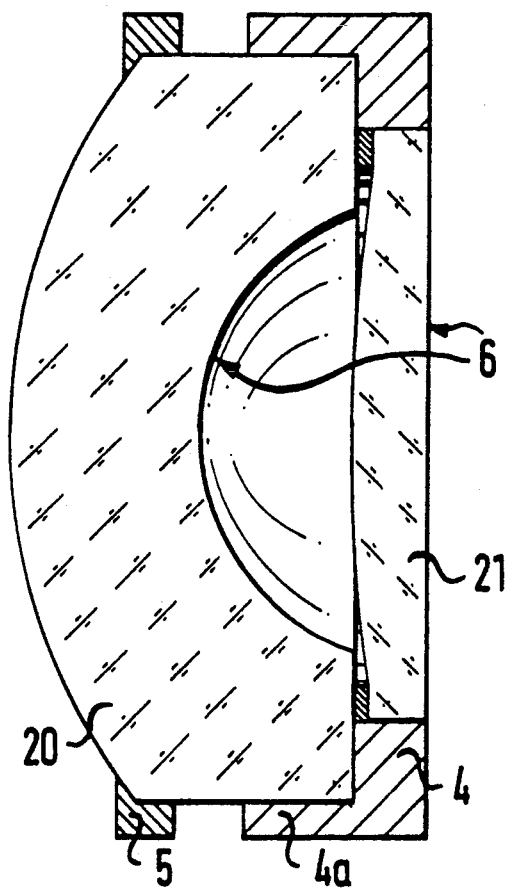
FIG. 6 shows a longitudinal section through the lens system of an objective with an image-side meniscus designed as an aspherical lens.

In corresponding manner, this construction may also be used in conjunction with the object-side lens cluster 6 of the objective according to FIG. 6. In this case, the object-side meniscus comprises a single lens 20, whereas the lens 21 forming the image-side meniscus is designed as an aspherical lens.

Figure 2:
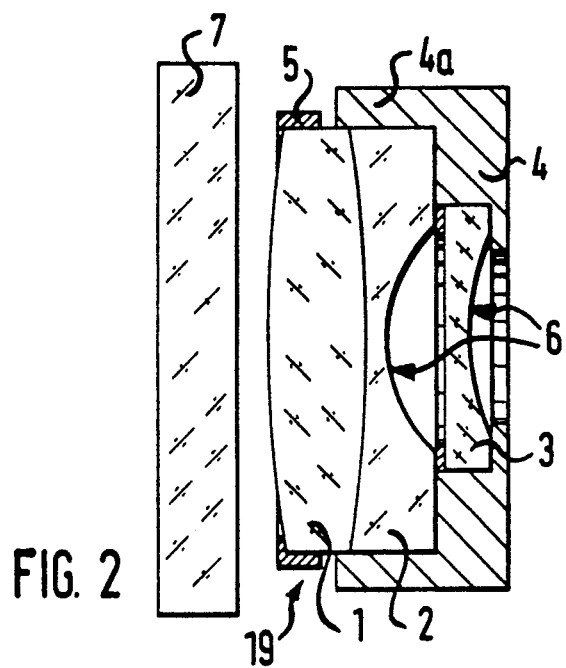
FIG. 2 shows a longitudinal section through the object-side lens system of an objective.

Moreover, the lens 3 shown in FIG. 2 could also be replaced by an aspherical lens and the cemented component comprising the two lenses 1 and 2 by a single lens like the solution shown in FIG. 6.

The present invention may be embodied in other specific forms without departing from the spirit or essential attributes thereof and, accordingly, reference should be made to the appended claims rather than to the foregoing specification as indicating the scope of the invention.

I claim:

1. Endoscope optical system, in which the object-side part of the objective is a negative lens cluster, wherein the lens cluster comprises two menisci each having negative refractive power, wherein the object-side meniscus Lx and the image-side meniscus Ly lie on the same axis, and wherein the following relationships apply for the refractive index n and the Abbe number v of the menisci:

$n(Lx) < n(Ly)$ $v(Lx) > v(Ly)$

2. Endoscope optical system according to claim 1, wherein the object-side meniscus Lx is designed as a cemented component comprising an outer lens L1 and an inner lens L2 which lie on the same axis as a lens L3 forming the image-side meniscus Ly, and wherein the following relationships apply for the refractive index n and the Abbe number v of the lenses L1, L2 and L3:

$n(L2) < n(L1)$ $n(L2) < n(L3)$ $v(L2) > v(L1)$ $v(L2) > v(L3)$

3. Endoscope optical system according to claim 1, wherein the lens forming the image-side meniscus Ly is designed as an aspherical lens.

4. Endoscope optical system according to claim 1, wherein both menisci are cemented into a common holder and form a constructional unit with this holder which is aligned with optical components following on the image side.

5. Endoscope optical system according to claim 4, wherein the image-side meniscus is cemented into the holder without backlash, and wherein the object-side meniscus is cemented into the holder to run true, aligned with the image-side meniscus.

6. Endoscope optical system according to claim 4, wherein the holder has, as an aperture stop, an edge at least partially overlapping the object-side meniscus.

7. Endoscope optical system according to claim 1, wherein a stop cap is cemented on the object-side meniscus.

8. Endoscope optical system having an objective with an object-side part that is a negative lens cluster, the lens cluster comprising an object-side meniscus Lx and an image-side meniscus Ly which each have negative refractive power, the image-side meniscus Ly being formed by a lens L3 and the object-side meniscus Lx being a cemented component comprising an outer lens L1 and an inner lens L2 which lie on a common axis with the lens L3, the lenses L1, L2 and L3 having a refractive index n and an Abbe number v which follow the following relationships:

$n(L2) < n(L1)$ $n(L2) < n(L3)$ $v(L2) > v(L1)$ $v(L2) > v(L3)$

* * * * *